April 2, 1940.  J. M. BING  2,195,640
PHOTOGRAPHIC EXPOSURE METER
Filed July 1, 1938
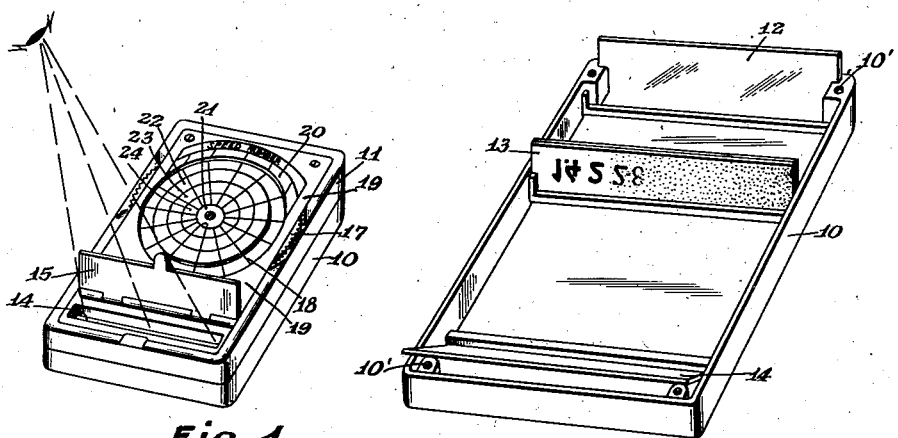
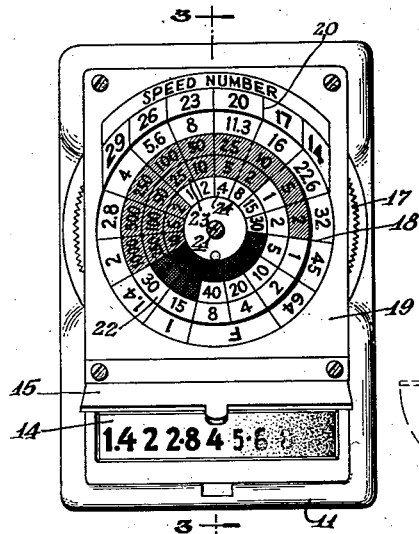
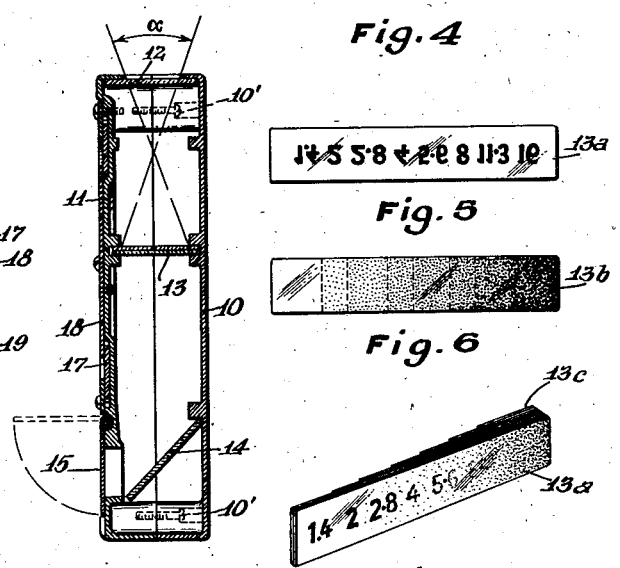
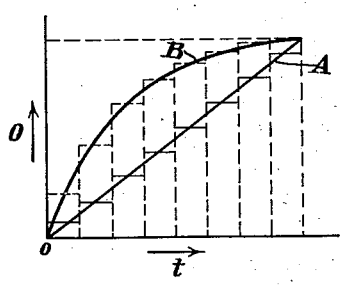
INVENTOR.
Joseph M. Bing
BY
ATTORNEY.

Patented Apr. 2, 1940

2,195,640

UNITED STATES PATENT OFFICE 2,195,640

PHOTOGRAPHIC EXPOSURE METER

Joseph M. Bing, New York, N. Y.

Application July 1, 1938, Serial No. 216,894
In Germany March 24, 1938

6 Claims. (Cl. 88—23)

The present invention relates to photographic exposure meters for determining the proper exposure data for a camera or other photographic device, more particularly to exposure meters of the optical or extinction type and among the objects of the invention is to provide a meter which is both simple in construction, light in weight, easy to operate and accurate in the results obtained.

A more specific object of the invention is to provide an exposure meter of the optical type which can be read instantly without the necessity of adapting the user's eye to existing average light conditions and which enables an immediate conversion of a read scene or object brightness into photographic exposure data without removing the meter from the reading position.

Another object is to provide an exposure meter of the type to be held at a distance from the user's eye in the reading position, whereby the viewing direction is substantially different from the direction of the scene or object to be photographed.

A further object is the provision of an exposure meter enabling a direct reading and/or exposure adjustment without requiring any intermediary calculation or conversion.

Further details and objects of the invention will appear as the following description proceeds taken with reference to the accompanying drawing forming part of this specification and wherein Figure 1 is an isometric view of a preferred construction of an exposure meter according to the invention, Figure 2 is an enlarged top view of the meter according to Figure 1 showing the details of the calculator for converting a read scene brightness into exposure data for a photographic camera, Figure 3 is a longitudinal cross-section of the meter taken on line 3—3 of Figure 2, Figure 4 is an enlarged isometric view similar to Figure 1 with the upper part of the meter removed, Figures 5, 6 and 7 illustrate forms of construction of the optical wedge embodied in the meter according to the invention, Figure 8 is a graph illustrating the construction of the optical wedge.

Like reference numerals are used to denote like parts throughout the different views of the drawing.

Referring more particularly to Figures 1 to 4, the improved exposure meter shown comprises substantially a flat rectangular casing having a lower half 10 and an upper half 11 made of any suitable material preferably a condensation product of the phenolformaldehyde type known by the trade name "Bakelite" or an equivalent moldable and fixable material. The two halves 10 and 11 are connected in any suitable manner such as by means of screws 10' as shown in Figure 3. In one of the shorter end walls of the casing there is mounted a plate 12 of light pervious material such as frosted glass, Celluloid, cellulose acetate, or an equivalent material to enable the entrance of light rays reflected from a scene or object field to be photographed towards which the meter is pointed in the reading position. At a suitable place between the plate 12 and the opposite end wall and the casing there is placed an optical wedge member 13 substantially parallel to the plate 12, while a mirror or equivalent reflecting member 14 is mounted at the opposite end of the casing serving to deflect the light rays passing the wedge member 13 at an angle preferably a right angle, that is in a vertical or upward direction towards the eye of an observer in the reading or horizontal position of the meter. Plate 12 and wedge member 13 may be held in position in any suitable manner such as within grooves as shown in the drawing.

The optical wedge 13 in the example illustrated comprises a plate to which are applied a series of numbers, letters or other marks and having a transparency or opacity varying gradually or step by step from one end to the other. One simple way of making such a wedge consists in providing a pair of plates of glass, Celluloid, or the like, one of which plates (13a according to Figure 5) is transparent and has applied thereon opaque or dark numbers or marks, etc., while the second plate (13b according to Figure 6) superimposed upon the plate 13a forms an optical wedge having an opacity or transparency increasing gradually or in steps from one end to the other according to a desired law or relationship. In this manner, by superimposing the plates 13a and 13b which may be connected together such as by gluing, riveting or in any other suitable manner, there is obtained a composite plate with dark marks such as numbers or letters appearing against a background of gradually increasing opacity from left to right as shown in the example illustrated.

Another way of constructing a wedge suited for the purpose of the invention is to cover the plate 13a with a number of sheets or plates 13c, Figure 7, of substantially like opacity but of successively decreasing length to obtain a staggered composite wedge member with a similar effect to the preceding example as will be readily understood.

In a preferred alternative construction of the wedge 13, the letters or marks form transparent portions of gradually increasing opacity from one end to the other against a dark background. In this case, the plate 13a, is substantially opaque with the exception of the parts occupied by the letters or marks which are transparent in a manner similar to a photographic negative or stencil. If this plate is superimposed upon an optical wedge plate of the type according to 13b or 13d there will appear upon the mirror 14, in the example illustrated, a series of numbers or marks of gradually increasing opacity from left to right upon a dark background as is readily understood.

In the example illustrated, the numbers applied to the wedge 13 which are characteristic of the scene or object brightness represent decreasing diaphragm openings or increasing relative "stop" numbers according to the well known "f" system, thereby avoiding special "brightness" numbers or marks and resulting in increased simplicity both of the construction and operation of the meter as will appear in more detail hereafter.

In order to limit the angular spread of the light rays entering the meter to correspond to the object field to be reproduced in a camera, the wedge 13 is arranged at a suitable distance from the end of the casing or the plate 12 to form a channel or light baffle in such a manner that the effective field angle α, Figure 3, substantially corresponds to or is somewhat less than the average field angle of photographic cameras. In this manner the inclusion of light rays coming from objects outside the object field to be reproduced in a camera is substantially avoided such as the light from a bright sky which would cause erroneous exposure results. In order to shield the mirror 14 to prevent reflected and disturbing side light from interfering with the proper reading, there is provided a hinged baffle or shield 15 covering an opening above the mirror 14 and which may be swung into a vertical position as shown in Figures 1 and 2 to act as a light shield in the reading position.

It is thus seen from the foregoing that when holding the meter pointed in the direction towards the scene or object field whose brightness or "light value" is to be determined and by viewing the mirror 14 as shown in Figure 1, a series of numbers will be observed in the example illustrated the diaphragm or stop members f0.4 to f16 of or upon a background of gradually increasing opacity. The arrangement and design of the meter is such that the number which can just be ascertained or read with ease is characteristic of the existing scene brightness and it becomes the further object to convert this read number of scene brightness or "light value" into suitable exposure data for a photographic camera to obtain a well exposed picture.

It will be appreciated that the method of reading a scene or object brightness in the manner described has great advantages over the methods used with meters based on a similar principle. On the one hand, no mechanical adjustments are required in operating the optical wedge until the appearance or disappearance of any mark or number nor is there any unnecessary delay in accommodating the observer's eye each time before taking a measurement by firmly holding the meter close against the eye. In using the meter according to the invention the reading can be carried out instantly and the value read converted into proper exposure data without changing the position of the meter. The invention is further distinguished from meters of the type to be held at a distance from the user's eye in the reading position in which case direct rays from the scene or interfering lateral or reflected light may greatly interfere with the accuracy and proper reading. In using the meter described by the invention, this difficulty is substantially overcome by viewing the meter in a direction different from the direction of the scene or object to be photographed.

Referring to the calculator for translating a measured "light value" into photographic exposure data the same is mounted on the same face of the casing carrying the hinged cover 5 and is constituted by a conversion scale device comprising substantially three different types of scales two of which are fixed, while the third is adjustable relative to the meter casing. The latter adjustable scale in the example shown at 17 is of annular shape and arranged in a corresponding annular depression or guide groove in the top face of the cover 11. This rotatable scale has graduations 18 similar to those of the wedge 13, i. e. "stop" or diaphragm numbers from f1 to f64 in the example shown including the "stop" numbers on the wedge 13. The scale 17 is held in place by a cover plate 19 having a circular opening with its inner diameter adjacent to the outer diameter of the scale 18 on the rotatable member 17. The plate 19 is fixedly secured to the casing by means of screws or the like and carries a sector shaped scale 20 calibrated in film or plate speed numbers according to the well known "Scheiner" or any other system, said scale being adjacent to and cooperating with the "stop" or "light value" scale 18 on the rotatable member 17.

Scale 17 is thus guided within the annular depression in the upper face of the cover 11 and may be rotated relative to scale 20 for which purpose its outer edge is milled or knurled and the casing provided with suitable recesses at both sides in such a manner that the knurled edge of the disc 17 projects beyond the plate 19. Thus, if the meter is held in the palm of the hand, the thumb readily falls into position for turning the disc 17, whereby both reading and conversion may be carried out without changing the position of the meter.

There is further provided a third central disc shaped scale member 21 secured to the top face of the cover 11 partly overlying the rotatable disc 17. The scale 21 has its outer circular edge arranged adjacent to the inner edge of the scale 18 of the member 17. The member 21 carries a scale 22 calibrated in "shutter speeds." There are provided a pair of further scales 23 and 24 also calibrated in "shutter speeds" and arranged upon the member 21 concentrically with the first "shutter speed" scale 22. Each of the three "shutter speed" scales 22, 23 and 24 serves for use under different general light conditions to compensate for the difference in the average sensitivity or acuity of vision of the human eye. Thus, the outer scale 22 in the example shown corresponds to outdoor objects or scenes in bright daylight or sunshine. The scale 23 applies to scenes on heavily clouded days without sunshine or to light interiors. The inner scale 24 applies to night scenes or dark interiors, dense woods, etc. Ordinarily, the outer scale is used for the majority of photographic objects while the use of the remaining scales may be acquired by a short practice in a simple and easy manner. In the example shown, the numbers on a simple hatched background represent fractions of a second, those on a white background represent seconds and those on a double hatched background represent the minutes in accordance with standard practice.

The design of the optical wedge may be such that the opacity varies linearly either gradually or in steps from one end to the other such as shown by the graph in Figure 8 (line A). In this case, by the proper design of the scales 22 to 24 it is possible to correct for the different acuity of vision or sensitivity of the human eye under different average light conditions as pointed out hereinabove. According to a modification, the wedge 13 may be designed according to a non-linear law to compensate for the fact that the human eye is capable of discerning relative differences of brightness more easily under low average light conditions than in strong lights. The opacity of the wedge may vary according to a curve such as shown in B in Figure 8 which theoretically follows an exponential law. If a wedge constructed in this manner is used, it may be possible to dispense with the additional "shutter speed" scales or the latter may be additionally employed to compensate for different acuity of vision for different average light conditions.

In use the meter is pointed towards the object or scene to be photographed as shown in Figure 1 with the cover 15 raised to expose the "stop" figures on the graduated wedge at the bottom of the reading slot. As pointed out, this cover in the raised position serves as a shield or guard against front light for convenience and greater accuracy of reading. In the reading slot there will appear as many of the light values or stops from 1.4 to 16 in the example illustrated as correspond to the brightness of the object. Starting from the highest figure, the user then decides which is the dimmest or faintest stop number that is readable without effort. By then rotating the stop scale 17 of the calculator until the faintest figure read in the reading slot is opposite the proper speed of the film used on the scale 20, all stops are aligned with the corresponding exposure times or shutter speeds on the inner scales or time circles 22, 23 and 24. The choice of the proper time circle depends on the type of illumination under which the observer reads or the acuity of vision as described hereinabove.

As will be understood, the "stop" and "shutter speed" scales may be mutually exchanged without substantially affecting the operation and results obtained. The provision of "stop" numbers on the optical wedge in place of special "light value" numbers or marks greatly simplifies the construction and the operation of the device as is understood from the above. A further advantage of using exposure figures such as "stop" numbers as brightness marks on the graduated wedge, besides dispensing with a special "brightness" or light "value" scale is the fact that in this manner it is possible to use the meter without the conversion device or calculator by employing a definite exposure time for a given film speed. Thus, referring to Figure 2, it is seen that by employing an exposure time of $\frac{1}{50}$ second and a film having a speed number 23 or any other correlated exposure time and film speed numbers appearing opposite each other on the scales 20 and 24, the figures read in the reading slot represent the proper stop or lens diaphragm settings under the chosen conditions. Since the films generally used at present have speeds ranging from about 20 to 26° Scheiner and the exposure time and shutter speeds for the majority of subjects are from $\frac{1}{25}$ to $\frac{1}{100}$ of a second, it is seen that in this manner the exposure meter according to the invention affords an instantaneous determination of the proper exposure values without the necessity of operating any movable elements for the great majority of cases under average light and picture taking conditions.

It will be evident from the above that the invention is not limited to the specific details and constructions shown herein for illustration, but that the invention is susceptible of numerous embodiments and variations coming within its broad scope and spirit as defined in the appended claims. The specification and drawing are accordingly to be regarded in an illustrative rather than a limited sense.

I claim:

1. In a visual photographic exposure meter, the combination of a light meter unit comprising a casing having a pair of openings defining a light passage therebetween, the first of said openings being provided in the front wall and the second opening being provided in the top wall of said casing near the rear edge thereof, an optical wedge element located within said casing at an intermediate point between said openings, said wedge element having a series of scene brightness marks thereon of gradually increasing opacity, a light deflecting device located within said casing adapted to deflect light rays entering the first opening and passing said wedge in a direction towards said second opening whereby, by holding said casing with said first opening facing a photographic scene, the brightness mark being just readable by viewing said wedge through said second opening is characteristic of the scene brightness to be determined under a given average light condition, and a converting unit mounted upon the top wall of said casing adjacent to said second opening for translating a read scene brightness into appropriate photographic exposure data, said converting unit having relatively adjustable scale members calibrated in exposure determining values for a photographic camera, one of said scale members having a series of marks thereon identical to those on said wedge element and being arranged to be set in accordance with the brightness mark read on said wedge element, and another of said scale members having a plurality of adjacent identical staggered scales each of the staggered scales being designed for use under a different principle average light condition.

2. In a visual photographic exposure meter, the combination of a light meter unit comprising a casing having a pair of openings defining a light passage therebetween, the first of said openings being provided in the front wall and the second opening being provided in the top wall of said casing near the rear edge thereof, an optical wedge element located within said casing at an intermediate point between said openings, said wedge element having a plurality of marks thereon of gradually increasing opacity representing a consecutive series of exposure values for a photographic camera, an inclined mirror located within said casing opposite said second opening whereby, by holding said casing with its front opening facing a photographic scene the mark being just readable by viewing said wedge through said second opening and mirror is characteristic of the scene brightness to be determined under a given average light conditon, and a converting unit mounted upon the top wall of said casing adjacent to said second opening for translating a read scene brightness into appropriate photographic exposure data, said converting unit comprising a first adjustable scale member having a series of exposure marks thereon identical to those on said wedge element and arranged to be set according to the mark read on said wedge, and a second relatively fixed scale member calibrated in coordinated camera exposure values, said last mentioned scale member having a plurality of adjacent identical staggered scales, each of said staggered scales being designed for use under a different average light condition in cooperation with the first mentioned scale member.

3. In a visual photographic exposure meter, the combination of a light meter unit comprising a casing having a pair of openings defining a light passage therebetween, the first of said openings being provided in the front wall and the second opening being provided in the top wall of said casing near the rear edge thereof, an optical wedge element located within said casing at an intermediate point between said openings, said wedge element having a plurality of marks comprising a consecutive series of "stop" numbers for a photographic camera of gradually increasing opacity, an inclined mirror located within said casing opposite the said second opening whereby, by holding said casing with its front opening facing a photographic scene, the mark just readable by viewing said wedge through the second opening and mirror is characteristic of the scene brightness to be determined under a given average light condition, and a converting unit mounted upon the top wall of said casing adjacent to said second opening for translating a read scene brightness into appropriate photographic exposure data, said converting unit comprising a first adjustable scale member having a series of "stop" markings thereon identical to those on said wedge element and arranged to be set according to a mark read on said wedge, and a second relatively fixed scale member arranged in cooperative relation to the first scale member calibrated in coordinated shutter speed values, said last scale member having a plurality of adjacent identical staggered scales, each of said staggered scales designed for use under a different average light condition.

4. In an exposure meter as claimed in claim 2, a third scale member calibrated in emulsion speeds and arranged to cooperate with a mark of said first scale member.

5. In a visual photographic exposure meter, the combination of a light meter unit comprising a casing having a pair of openings defining a light passage therebetween, the first of said openings being provided in the front wall and the second opening being provided in the top wall of said casing near the rear edge thereof, an optical wedge element located within said casing at an intermediate point between said openings, said wedge element having a plurality of marks thereon representing a consecutive series of exposure values for a photographic camera of gradually increasing opacity, an inclined mirror located within said casing opposite to the said second opening whereby, by holding said casing with its front opening facing a photographic scene, the mark being just readable by viewing said wedge through said second opening and mirror is characteristic of the scene brightness to be determined for a given average light condition, and a converting unit mounted upon the top wall of said casing adjacent to said second opening and comprising a first adjustable scale member having a series of exposure marks thereon identical to those on said wedge and arranged to be set according to a mark read on said wedge, and a further relatively fixed scale member arranged in cooperative relation to the first scale member and calibrated in coordinated exposure values.

6. In an exposure meter as claimed in claim 2, a cover member hinged to the front edge of said second opening adapted to close said opening in the non-use condition of the meter and to be swung to a substantially vertical position to serve as a light shield in the operative position of the meter.

JOSEPH M. BING.